US008984023B2

(12) United States Patent
Arenswald et al.

(10) Patent No.: US 8,984,023 B2
(45) Date of Patent: Mar. 17, 2015

(54) MONITORING STORED PROCEDURE EXECUTION

(71) Applicant: International Business Machines Corporation, Armonk, NY (US)

(72) Inventors: Stephan Arenswald, Stuttgart (DE); Andreas Limmer, Deckenpfronn (DE); Michael Reichert, Schoenaich (DE); John B. Tobler, San Jose, CA (US); Matthias Tschaffler, Nufringen (DE); Maryela E. Weihrauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 13/645,657

(22) Filed: Oct. 5, 2012

(65) Prior Publication Data
US 2013/0091181 A1    Apr. 11, 2013

(30) Foreign Application Priority Data

Oct. 5, 2011 (EP) .................................. 11183909

(51) Int. Cl.
*G06F 17/30* (2006.01)
(52) U.S. Cl.
CPC .... *G06F 17/30415* (2013.01); *G06F 17/30433* (2013.01); *G06F 17/30477* (2013.01)
USPC .......................................................... 707/803
(58) Field of Classification Search
None
See application file for complete search history.

(56) References Cited

U.S. PATENT DOCUMENTS

| 6,845,392 | B2 |   | 1/2005  | Koontz et al. |          |
|-----------|----|---|---------|---------------|----------|
| 7,340,650 | B2 |   | 3/2008  | Westmacott    |          |
| 7,809,694 | B2 |   | 10/2010 | Nelson        |          |
| 8,015,454 | B1 | * | 9/2011  | Harrison et al. | 714/47.3 |
| 2004/0088278 | A1 |   | 5/2004 | Westmacott    |          |
| 2004/0210563 | A1 | * | 10/2004 | Zait et al.  | 707/3    |
| 2006/0212428 | A1 |   | 9/2006 | Nelson         |          |
| 2007/0282837 | A1 |   | 12/2007 | Klein          |          |
| 2008/0098033 | A1 | * | 4/2008 | Farrar et al. | 707/104.1 |
| 2008/0183683 | A1 | * | 7/2008 | Barsness et al. | 707/3 |
| 2013/0117256 | A1 | * | 5/2013 | Gu et al.     | 707/718  |

OTHER PUBLICATIONS

Steven E. Fafard, "OMEGAMON Extended Insight Analysis: Where Is Your Application Spending Its Time?", OMEGAMOM Extended Insight White Paper, International Business Machines Corporation, Apr. 2011, pp. 1-16.
International Search Report and Written Opinion for PCT/IB2012/055152, Mailed December 25, 2012, From Japan Patent Office, pp. 1-9.

* cited by examiner

*Primary Examiner* — Jay Morrison
(74) *Attorney, Agent, or Firm* — Law Office of Jim Boice

(57) ABSTRACT

A computer-implemented method, system, and/or computer program product monitors stored procedures that are executed in a database management system. A determination is made, for a stored procedure that is executed in a database management system, of an identification of the stored procedure and event data related to the stored procedure. The event data includes when the stored procedure began and ended executing, an SQL identifier for an SQL statement in the stored procedure, and a counter of how many times the SQL statement executed. The database management system provides values of parameters used when executing the SQL statement. These values are then correlated with the count of how many times the SQL statement executed.

18 Claims, 7 Drawing Sheets

MONITORING STORED PROCEDURE EXECUTION

The present invention relates generally to a method for monitoring stored procedures executed in a database management system, as well as to a stored procedure performance monitoring system. Still more particularly, the present invention relates to a database system, a computer system, a data processing program, and a computer program product for performing the above-stated method.

BACKGROUND

Today, the amount of data stored and processed by database systems, in particular by relational database systems, grows at an accelerating rate. Due to the ever growing data volume, access times to data stored in the database are continuously growing. This puts an enormous pressure on database administrators to optimize the functionality and performance of database systems.

Nowadays, many database management systems are equipped with related optimization and monitoring tools. The purpose of database management systems is to organize data and allowing quick and convenient access to retrieve stored data. There are various types of database management systems, such as relational database management systems, hierarchical database management systems, and network database management systems. Typical data access statements may comprise read, write, update and delete statements.

However, monitoring and tracking the internal functionality of a database requires additional computing power which may negatively influence the overall performance of the database management system. A well-known technique for measuring the performance of a database management system relates to snapshot data. Snapshot data deliver continuous information about the internal functionality of a database. For example, times to store data, required times to find and read data and/or times to delete data are continuously measured. Typically, a snapshot data record represents a large amount of data about the internal functionality and actual status of a database management system. Other data are related to events in the database, e.g., a notification about started and finished SQL statements or other events of similar nature. Alerting may also be related to specific events On the other side, stored procedures became very popular in order to offload logical operations from application programs. Meanwhile, such application logic may now be executed as part of the database—much closer to the data—in stored procedures. Often, loops are being executed in stored procedures. And typically, only execution times for complete stored procedures may be measured as part of global snapshot and event data. In order to optimize the functionality and performance of a database it may be required to have much more fine-granular information about execution of SQL statements within a stored procedure. On the other side, such close monitoring is equivalent to additional overhead for a constant measurement of performance data of the database.

A query language is typically used to access the data and the database management system. Database application programs can be written using the query language to access the data stored in the database. For example, the structured query language (SQL) is one well-known query language. The database application program may be written using SQL in combination with other programming languages such as COBOL, PL/1, JAVA, and C, to access the data stored in the database.

A module, referred to as a "stored procedure" (SP), can be used to access the data in one or more database management systems. The stored procedure may be a program or a script file, and is physically stored at a database management system, typically the database management system on which the stored procedure may be accessed. The database application program may invoke or call one or more stored procedures. The stored procedure typically may comprise one or more data access statements (SQL statements), or calls to other stored procedures for issue data requests, for data from one or more databases (nested stored procedures). For example, the stored procedure may comprise one or more SQL statements to retrieve data from the database management system. Stored procedures may be shared with multiple database application programs.

Today's monitoring support for stored procedures may deal with two main problem areas. Firstly, for most database administrators the stored procedure may be a "black box" from a monitoring perspective. They may not know what is happening "inside" a stored procedure. Secondly, in order to get a certain level of detail today, a database administrator may need to take up "very expensive" tracing with significant CPU overhead. As a further step a manual match of the detailed information collected, for example, about statements executed in the stored procedure, may need to be carried out. This may be a very expensive, time-consuming and error-prone process. Furthermore, event and snapshot data collection may not take the time into account that is spent in the application logic of the stored procedure.

Thus, there may be a need for an improved performance management method for stored procedures in a database management system without an additional performance burden caused by collecting additional performance data within a stored procedure.

SUMMARY

The above-described need is presently addressed by a method for monitoring of stored procedures in a database management system, a stored procedure performance monitoring system, a database system, a computer system, a data processing program, and a computer program product according to the independent claims.

In one embodiment, a computer-implemented method for monitoring of stored procedures executed in a relational database management system is provided. The method may comprise providing for one of the stored procedures the following event data together with an identification of the stored procedure: a first time indicative of a beginning of an execution of the stored procedure; a second time indicative of an end of the execution of the stored procedure; at least one SQL statement identifier assigned to an SQL statement executed as part of the stored procedure; and for each SQL statement identifier a counter indicative of the number of executions indicating how often the related SQL statement is executed between the first time and the second time as part of the stored procedure. Additionally, the method may comprise providing regular database monitoring information, in particular global snapshot data, by the database management system, wherein the regular database monitoring information comprises values of parameters of executed SQL statements identifiable by the SQL statement identifier. Furthermore, the method may comprise correlating values of parameters of executed SQL statements identifiable by the SQL statement identifier with a counter of the number of executions indicating how often the related SQL statement may have been executed between the first time and the second time as part of the stored procedure. This may result in monitoring data for the stored procedure identifiable by the identification of the stored procedure.

In another embodiment, a monitoring system for monitoring of stored procedures executed in a database management system, in particular, a relational database management system is provided. The monitoring system may comprise a first providing unit adapted for providing for one of the stored procedures the following event data together with the identification of the stored procedure: a first time indicative of a beginning of an execution of the stored procedure; a second time indicative of an end of the execution of the stored procedure; at least one SQL statement identifier assigned to an SQL statement executed as part of the stored procedure; and for each SQL statement identifier a counter indicative of the number of executions the related SQL statement may have been executed between the first time and the second time as part of the stored procedure. The monitoring system may comprise a second providing unit adapted for providing regular database monitoring information by the database management system, wherein the regular database monitoring information comprises values of parameters of executed SQL statements identifiable by the SQL statement identifier. Furthermore, the monitoring system may comprise a correlating unit adapted for correlating values of parameters for executed SQL statements identifiable by the SQL statement identifier with the counter of the number of executions the related SQL statement executed between the first time and the second time as part of the stored procedure, resulting in monitoring data for the stored procedure identifiable by the identification of the stored procedure.

It may be noted, that typically the regular database monitoring information, i.e. snapshot data and/or event data, may relate to all statements having been executed inside and outside the stored procedures having an identical SQL statement identifier. It may also be noted that the term "correlating values" may in particular mean building average values of the available values.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

Figure 1:
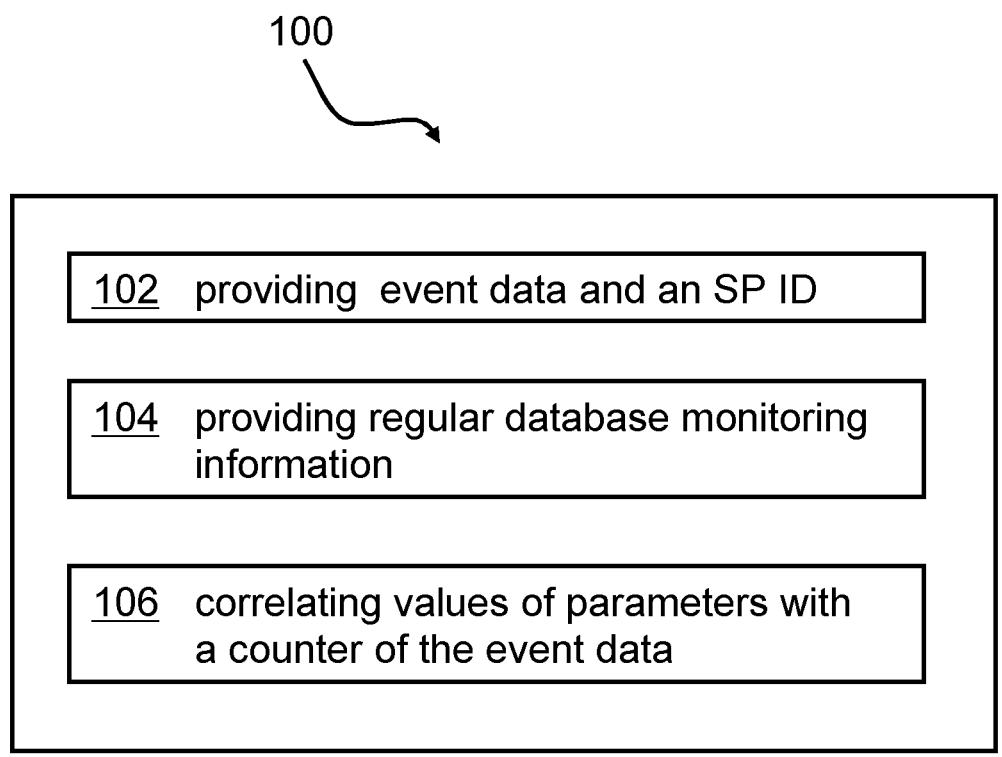
FIG. 1 shows a block diagram for an embodiment of the method for monitoring of stored procedures.

In the context of this application, the following conventions have been followed:

Database management system—A database management system denotes any database management system suitable for storing and accessing data. It may be a relational database management system in which data are organized in rows and columns, a hierarchical database management system or a network database management system.

Stored procedure—A stored procedure denotes a user-written program that may implement business logic and that may be called by an application program using, e.g., a "CALL" statement. Typically, stored procedures may be compiled and stored as part of a database management system or database engine. Among improving an application development by using modularity, stored procedures may also have benefits in terms of improved application security because application logic may run under the control of the database server, and may support application integration solutions. Furthermore, they may be used to enforced business logic.—In other words, the term stored procedure may denote a subroutine available to software applications accessing a database system, in particular a relational database system. Stored procedures may actually be stored in a database data dictionary relating to the database management system. Stored procedures may be used to consolidate and centralize application logic that was originally implemented in software applications. Extensive or complex processing that may require an execution of several SQL statements may be moved into stored procedures, and all software applications may call the procedures. One may use nested stored procedures by executing one stored procedure from within another.

Identification of a stored procedure—Specific stored procedures in a specific database management system may have a unique identifier related to the specific stored procedures. All activities related to the specific stored procedures may thus be tracked using the identification of the stored procedure. It may be a unique number.

First time—The term "first time" denotes a first time instance with a specific time stamp. A first time may denote a start of a stored procedure. Every time a stored procedure may be called, a first time may be recorded for later analysis purposes.

Second time—The term "second time" denotes a second time instance with another specific time stamp. A second time may denote an end of a stored procedure. Every time a stored procedure may be terminated, a second time may be recorded for later analysis purposes.

Regular database monitoring information—Typically, database management systems store regularly statistical data about their internal functionality. Execution times of statements are just one example. Other data may include page misses and many more statistical data as mentioned below. Regular database monitoring information may also comprise synchronously collected snapshot data and/or asynchronously collected event data.

Parameter—The term parameter denotes a specific measure for one statistical information of database performance. Each parameter may contain specific values. The values may change over time.

SQL statement—The term "SQL statement" denotes a statement for a database management system. It may be understood as standard "structured query language" statement for managing data in a relational database management system. Several dialects are known today: SQL-86, SQL-89, SQL-92, SQL:1999, SQL:2003 or SQL:2008. The SQL language may have a predefined set of language constructs which are well-known by a person skilled in the art.

SQL statement identifier—Specific SQL statements in a specific database management system may have a unique identifier related to the specific SQL statements. All activities related to the specific SQL statements may thus be tracked by the identification of the SQL statements. It may be a unique number.

The above-described method for monitoring of stored procedures executed in a database management system may offer a couple of advantages.

The inventive method and the monitoring system may allow a much more elegant monitoring of stored procedures compared to known techniques, and thus a better performance tuning of database management systems. This may be achieved without the burden of tightly monitoring executed statements within a stored procedure according to the state-of-the-art. It may not be required for every executed statement to collect regular database monitoring information, AKA snapshot data. Instead, for the purpose of monitoring "inside operations" of a stored procedure, only a very limited amount of data may be collected. Instead of collecting global snapshot data for every executed statement within a stored procedure, information that is available anyway in the database management system—execution time of specific SQL statements—may be used instead for a monitoring of stored procedures.

In one embodiment of the method, the method may additionally comprise calculating average parameter values for at least one parameter using the values of the at least one parameter. As discussed above, this may allow a monitoring of stored procedures without collecting snapshot data for every SQL statement executed as part of a stored procedure. One of the parameters may be an execution time of a specific SQL statement. In an abstract form, such an SQL statement may be "READ ACCOUNT-BALANCE OF PERSON_A". All these read statements within and outside the stored procedure may be used to build an average execution time for the statement. The statement may be identified by, e.g., the identifier number "129". It may be noted that such performance data may be collected from the DBMS anyway for every SQL statement. Thus, no additional data collection may be performed to generate the average value of the parameter.

In another embodiment of the method, the correlating may correspond to a multiplying of the average parameter value of the at least one parameter with the number of executions of the identified SQL statement, wherein the SQL statement identifier, representing the SQL statement having the average parameter value equals, the SQL statement identifier relating to the number of executions. By doing so, computational-wise a "cheap" method is available to measure performance within stored procedures. This multiplication may be performed for every SQL statement type with specific SQL statement identifiers that are executed as part of the stored procedure and for all available parameters that may allow a computation of an average, i.e., not—for example, string variables. By summing up all of these multiplied data between the beginning and the end of the stored procedure, very good detailed performance data of internal operations of stored procedures may be provided.

In again another embodiment of the method, the regular database monitoring information may comprise only values of parameters related to executed SQL statements, identifiable by SQL statement identifier with those SQL statements that have been executed as part of the stored procedure. This embodiment may be called an "exact method". Filtered snapshot data may be used wherein the filtering delivers only parameter values for executed SQL statements within the stored procedure. Other parameters which may represent the majority of global snapshot data may not be collected. Thus, there may be no overhead generated by large global snapshot files for performance management operations within stored procedures.

In yet another embodiment of the method, each of the parameters of executed SQL statements is at least one out of the group consisting of a number of executions, a number of rows examined, a number of rows processed, a number of index scans, a number of table space scans, a number of buffer writes, an accumulated database time, an accumulated processor time (CPU time), an accumulated time for lock, and an accumulated wait time for synchronous I/O or, for synchronous execution unit switch or, for global locks or, for read activities done by another thread or for write activities done by another thread or, for latch or, for page latch or, for drain locks or, for drain locks for claims to be released or accumulated wait times for a log writer. Other options may comprise a number of getpages, a number of synchronous buffer reads, a number of database sort operations, a number of parallel groups created, a number of times a record ID list was not used because of exceeded limits, or a number of times a record ID list was not used because there was not enough memory to hold the list.

In again another embodiment of the method, a first buffer for storing the regular database monitoring information and a second buffer for storing the event data are operated independently from each other. This means that, in particular, two different buffer/storage areas may be used for the snapshot data and the event data. From an implementation point of view this means that database logic related to snapshot data may be left unchanged and that only the collection of event data may have to be added to the internal logic of the database management system in order to perform the inventive method.

In again another embodiment of the method, a combined buffer may be used for storing the regular database monitoring information and the event data. Such an implementation may have the advantage that snapshot data and event data may be stored on one database management buffer which may speed up access to these data.

In another embodiment of the method, the method may additionally comprise providing a first interface for making the monitoring data of the stored procedure available to a system outside a database server running the database management system. In particular, this may mean that calculations for generating the performance management data may be performed on the server and only a visualization of the performance data of the stored procedures may be performed on a client system comprising a graphical user interface.

In another embodiment of the method, the method may additionally comprise a second interface for making the event data and the regular database monitoring information available to a system outside the database server running the database management system. In particular, this may mean that all calculations may be performed on a client system that may be separate from the system running the database management system. In this case, all calculations regarding performance data of the stored procedure may be performed as part of a graphical user environment.

Furthermore, a computer or computer system may comprise the monitoring system for monitoring of stored procedures executed in a database management system. The monitoring system may also be implemented as a component of a database system, which may be part of a computer system.

It should be noted that embodiments may take the form of an entire hardware implementation, an entire software embodiment or, an embodiment containing both, hardware and software elements. In a preferred embodiment, the invention is implemented in software, which includes, but is not limited to, firmware, resident software and microcode.

In another embodiment, a data processing program for execution in a data processing system is provided comprising software code portions for performing the method, as described above, when the program is run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All illustrations in the figures are schematic. First, a block diagram for an embodiment of the method for monitoring of stored procedures will be described. Afterwards, embodiments of the method and a monitoring system for stored procedures will be described.

With reference now to the figures, FIG. 1 shows a block diagram 100 for an embodiment of a computer-implemented method for monitoring of stored procedures. The method may comprise providing (102) for one of the stored procedures the following event data together with an identification of the stored procedure: a first time indicative of a beginning of an execution of the stored procedure; a second time indicative of an end of the execution of the stored procedure; at least one SQL statement identifier assigned to an SQL statement executed as part of the stored procedure; and for each SQL statement identifier a counter indicative of the number of executions for related SQL statements is executed between the first time and the second time as part of the stored procedure. Furthermore, the method may comprise providing (104) regular database monitoring information—in particular, global snapshot data, by the database management system, wherein the regular database monitoring information may comprise values of parameters of executed SQL statements identifiable by the SQL statement identifier. It may be noted that, in particular, all statements of a specific kind, e.g., a specific read statement that may have been executed inside and outside the stored procedure may be identifiable by a unique SQL statement identifier.

Furthermore, the method may comprise correlating (106) values, in particular, average values, of parameters for executed SQL statements identifiable by the SQL statement identifier with the counter of the number of executions the related SQL statement may have been executed between the first time and the second time as part of the stored procedure. This may result in monitoring data for the stored procedure identifiable by the identification of the stored procedure. This means that monitoring data for the stored procedure may be derived from average execution time information of specific SQL statements.

Figure 2:
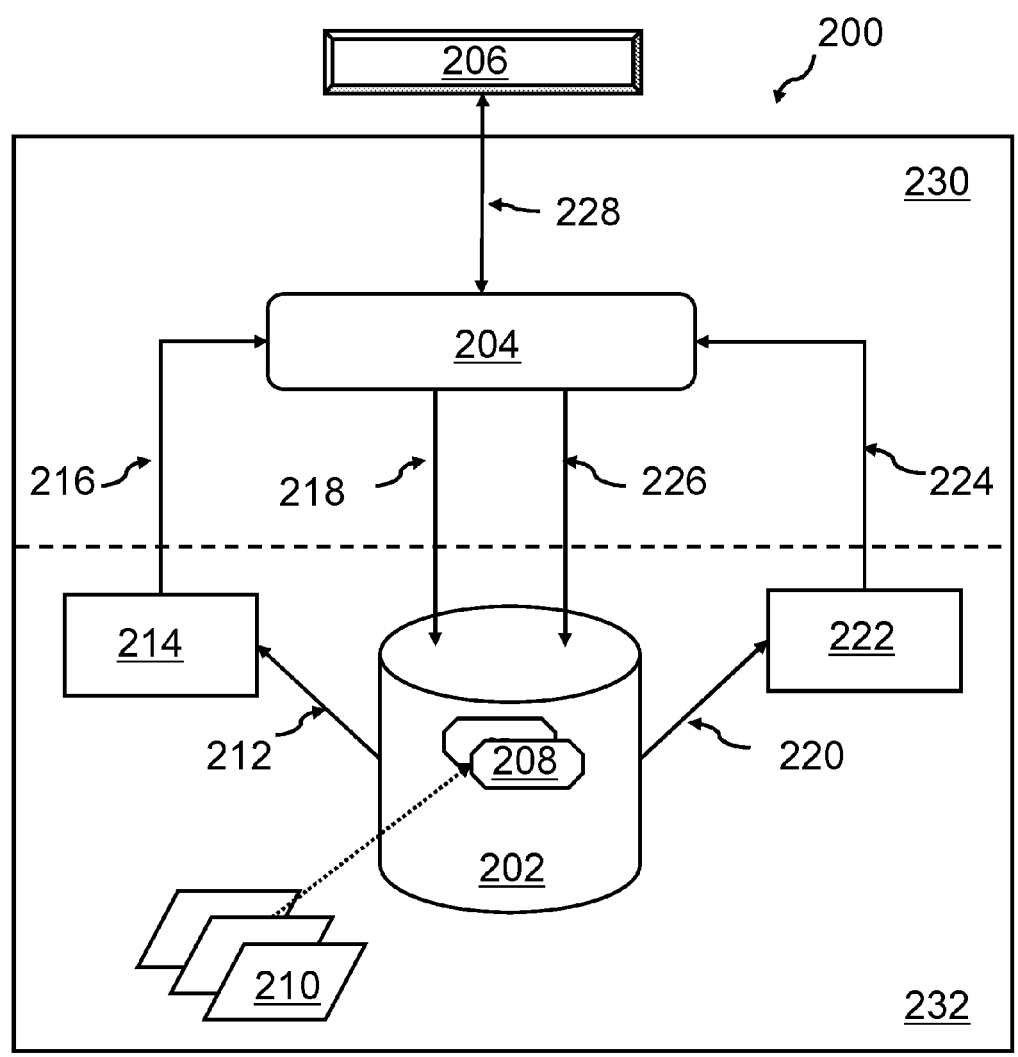
FIG. 2 shows a block diagram of components required for an embodiment of the method for monitoring of stored procedures.

FIG. 2 shows a block diagram 200 of components required for an embodiment of the method for monitoring of stored procedures. In a database management system 202, stored procedures 208 may be executed. The stored procedures 208 may be stored and managed in a stored procedure library 210. A database management monitoring data collection system may be represented by reference numeral 204. A user interface or system 206 may be available for delivering monitoring results to a database administrator. It may be noted that FIG. 2 is split horizontally in two halves. The upper half 230 may represent a processing end, whereas the lower part 232 of FIG. 2 may present a back-end. The back-end is more related to the physical storage of data, whereas the processing end may be more related to a control of information flows related to the monitoring system. The database management data collection system 204 may request (218) snapshot data—i.e., regular database monitoring information—from the database 202. Such a snapshot may be written (212) to a snapshot data buffer 214. Data flow arrow 216 may represent a read of snapshot data from the snapshot data buffer 214 into the database management monitoring data collection system 204. On the other side, the database management monitoring data collection system 204 may request (226) event data as specified above. These event data may be written (220) to an event data buffer 222. Data flow arrow 224 may represent a read of event data from the data buffer 222 to the database monitoring data collection system 204.

As an example, the snapshot data from snapshot data buffer 214 may comprise execution times for a specific SQL statement identifiable by a specific SQL statement identifier. Such a specific SQL statement may be a read for specific data from the database—e.g., example all transactions within an account between specific dates. The event data on the other side, being stored in the event data buffer 222 may, in particular, comprise a start time of a stored procedure, an end time of a stored procedure and at least a counter for counting the number of executions of the specific SQL statement as part of the stored procedure.

The database management monitoring data collection unit 204 may also combine and/or correlate the snapshot data of the snapshot data buffer with the event data from the event data buffer for making the required calculations, in particular multiplication of times and number of executions. The results may be sent (228) to a user interface, in particular a graphical user interface on which the monitoring data may be presented to a database administrator.

Figure 3:
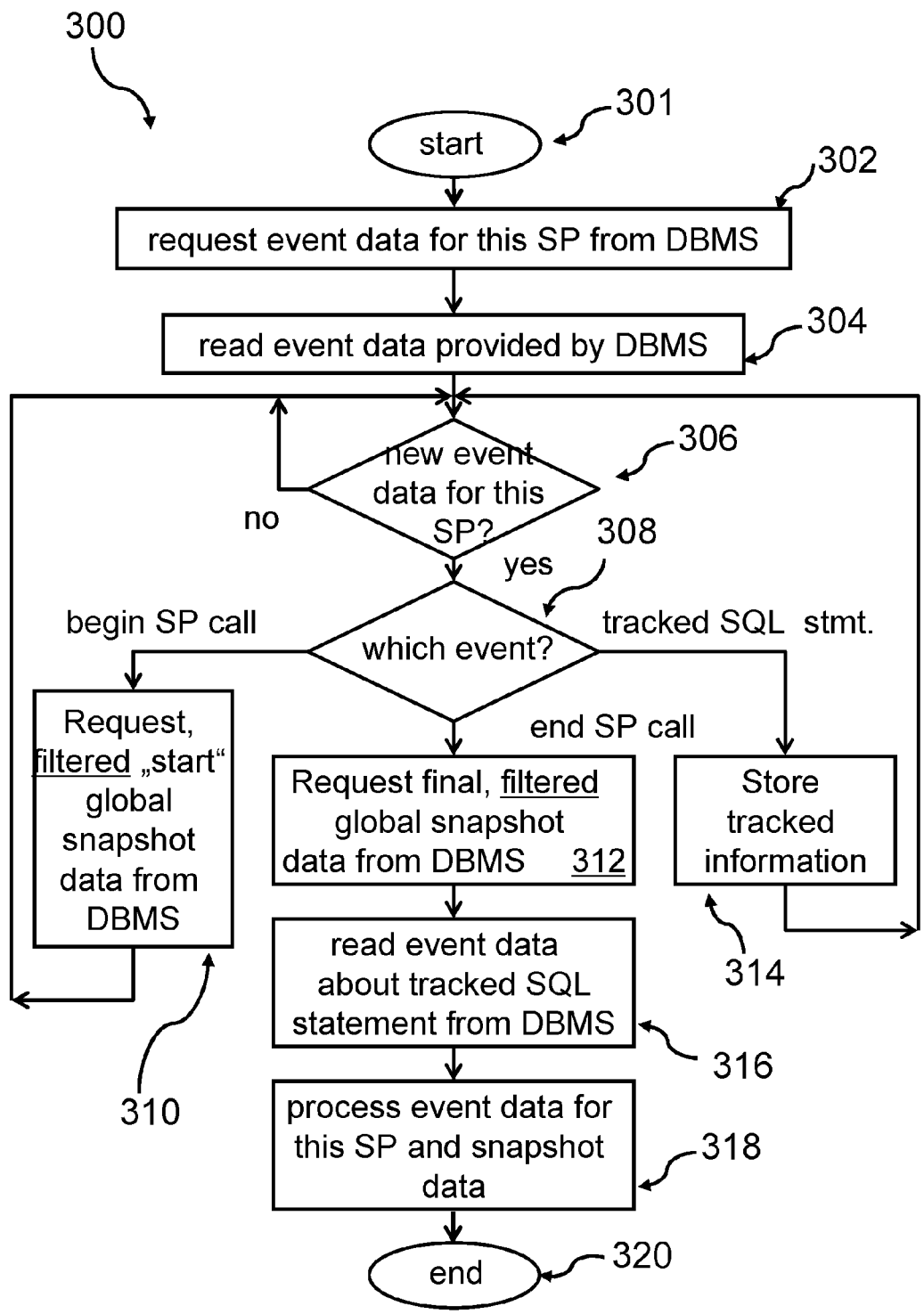
FIG. 3 shows a block diagram of a flow chart of an embodiment of the "precise method"

FIG. 3 shows a block diagram of a flow chart of an embodiment of the "precise method". If a stored procedure monitoring is enabled the following instructions according to flow chart 300 may be executed. After initiator block 301, a "request event data" for the stored procedure from the database management system may be initiated (302). As depicted in block 304, the event data provided by the database management system may be read. At query block 306, it may be checked whether new event data for this specific stored procedure may be available. If the answer is "No" the check may be repeated in a loop. If the answer is "Yes", then a query is made as to which event is present (query block 308). If the event is a "begin SP" call (SP=stored procedure), then a request for filtered "start global snapshot data" from the database management system may be issued (310). After this, the execution may return to the loop testing for new event data for this stored procedure. If the event may be an "end SP" call, a request for final, filtered global snapshot data from the database management system may be initiated (312). As described in block 316, event data about tracked SQL statements from the database management system may be read. Finally, the event data for the specific stored procedure and snapshot data may be processed (318). The kind of processing has already been discussed above. The process ends at terminator block 320.

If during the test which kind of event is present (308), the outcome may be that an SQL statement needs to be tracked, the tracked information may be stored (314). After this, the execution returns to the loop for testing whether new event data for the specific stored procedure may be available.

Figure 4:
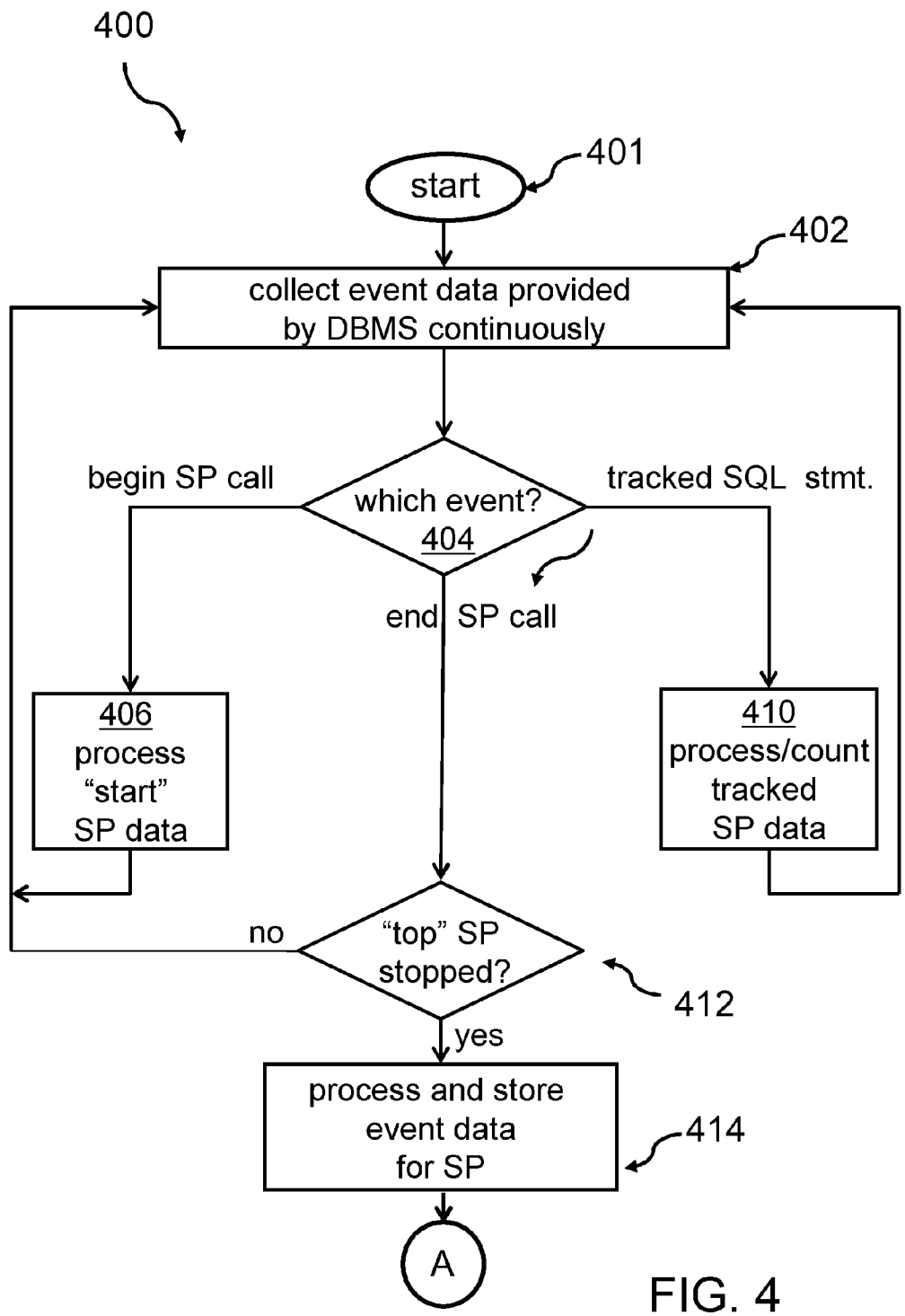
FIG. 4 shows a block diagram of a flow chart for an embodiment of a method part to be performed in the back end system of a database management system.
Figure 5:
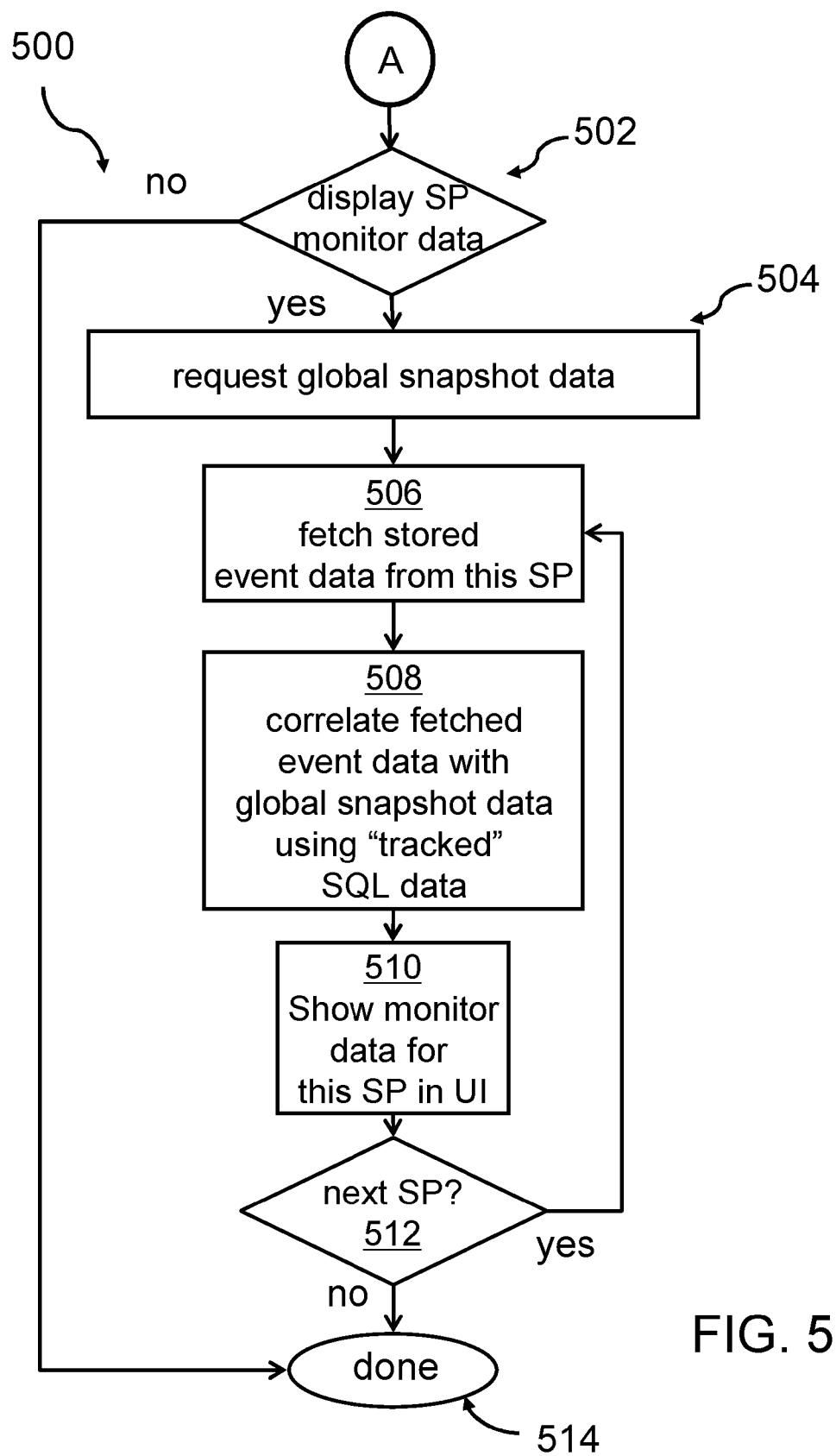
FIG. 5 shows an example of a block diagram of a flow chart to be executed on a processing end of a database management system for performing the method for monitoring of stored procedures.

In comparison to the "precise method" of FIG. 3, FIG. 4 and FIG. 5 relate to a "low-cost method". FIG. 4 relates to steps 400, which that may be executed in the back-end (e.g., element 232 in FIG. 2). If a stored procedure monitoring is switched on, event data provided by the database management system may be collected continuously (402). A query/test is made regarding what kind of event is present, as depicted in query block 404. If the event is a "begin call" for a stored procedure, a "start stored procedure data" is processed (406). After that, the execution may return to block/step 402. If the query/test depicted in query block 404 results in the fact that an end SP call is present, a test may be made regarding whether the end SP call is from a "top" stored procedure (query block 412). If calls to stored procedures within a stored procedure may be treated as "normal" SQL statement, then the discussed method may also work for nested stored procedures. This should be the case in an embodiment. Then, also an SP identifier may be required instead of the SQL statement identifier. After block/step 412 the event data for the stored procedures may be processed and stored (414). If in block/step 404 the result is that SQL statements have to be tracked, block/step 410 may be performed. Here tracked stored procedure data may be processed, in particular SQL statements may be counted how often they have been executed. After block/step 410, the execution may continue with block/step 402 from the beginning.

Flow chart 500 of FIG. 5, which may represent a continuation of the flow chart 400 of FIG. 4, shows an example of a block diagram of a flow chart to be executed on a processing end of a database management system for performing the method for monitoring of stored procedures. The execution steps shown in FIG. 5 may relate to the processing end (e.g., element 230 in FIG. 2). First, it may be checked whether stored procedure monitoring data may be displayed (query block 502). If the answer is "Yes", global snapshot data may be requested, as depicted in block 504. Additionally, as described in block 506, stored event data for the specific stored procedure may be fetched. Furthermore, in block/step 508, the fetched event data may be correlated with global snapshot data using tracked SQL statement statistical data. The kind of correlation has been discussed above already. Afterwards, in block/step 510, the monitoring data for this specific stored procedure may be displayed in a user interface. Then a test, as depicted in query block 512, may be performed whether another stored procedure may be analyzed. If the answer is "Yes", the execution may continue with block/step 506 in order to fetch stored event data for this other stored procedure. In case no next stored procedure may be analyzed, the execution of these steps may end, as depicted in terminator 514.

Figure 6:
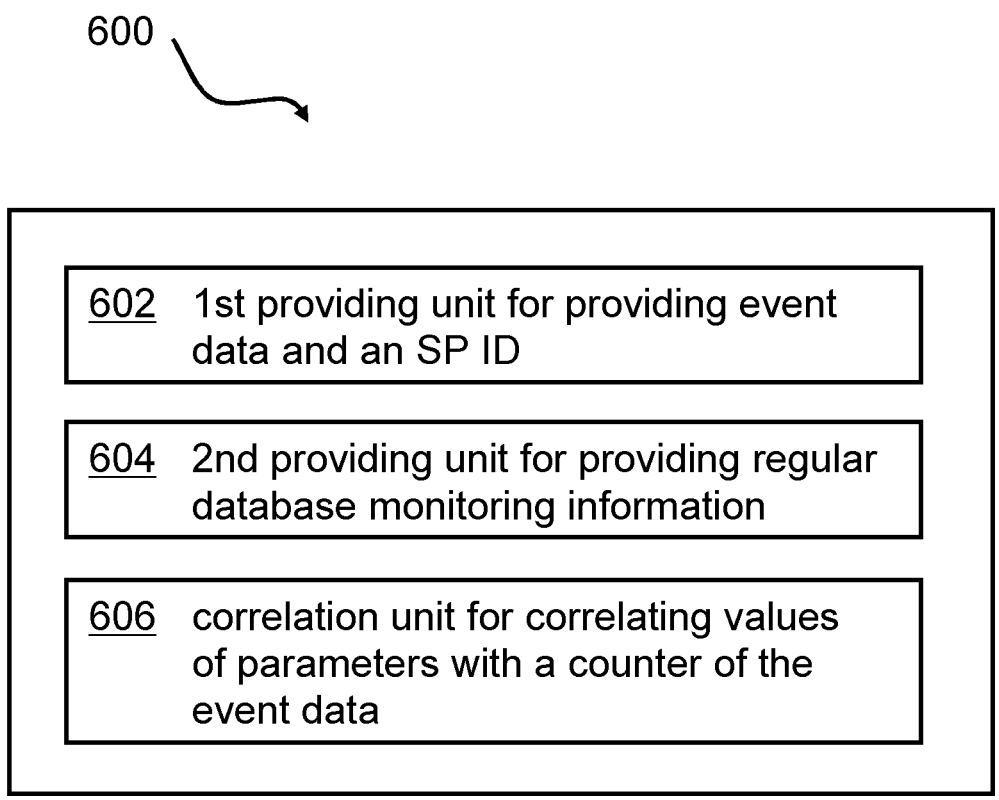
FIG. 6 shows a block diagram of an embodiment of the monitoring system for monitoring of stored procedures.

FIG. 6 depicts a block diagram of an embodiment of the monitoring system for monitoring of stored procedures. The monitoring system 600 may comprise a first monitoring unit 602 adapted for providing for one of the stored procedures the following event data together with an identification of the stored procedure: a first time indicative of a beginning of an execution of the stored procedure; a second time indicative of an end of the execution of the stored procedure; at least one SQL statement identifier assigned to an SQL statement executed as part of the stored procedure; and for each SQL statement identifier a counter indicative of the number of executions the related SQL statement is executed between the first time and the second time as part of the stored procedure.

Additionally, the monitoring system 600 may comprise a second providing unit 604 adapted for providing regular database monitoring information, in particular snapshot data, by the database management system. Thereby the regular database monitoring information may comprise values of parameters of executed SQL statements identifiable by the SQL statement identifier.

Furthermore, the monitoring system 600 may comprise a correlating unit 606 adapted for correlating values of parameters for executed SQL statements identifiable by the SQL statement identifier with a counter of the number of executions the related SQL statement executed between the first time and the second time as part of the stored procedure. This may result in monitoring data for the stored procedure identifiable by the identification of the stored procedure.

Figure 7:
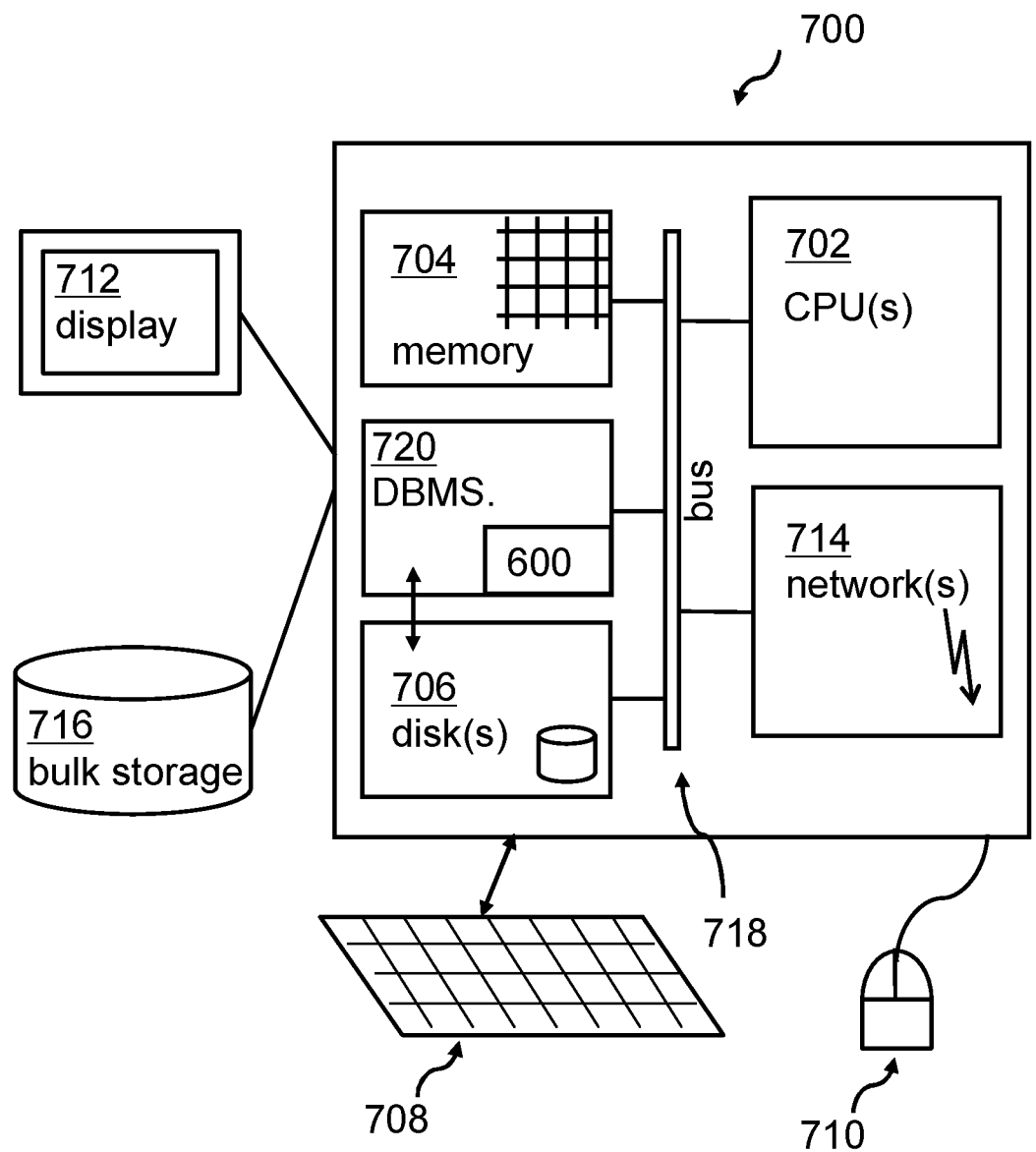
FIG. 7 shows a block diagram of a computer system including the monitoring system according to one embodiment.

Embodiments of the invention may be implemented on virtually any type of computer, regardless of the platform being used suitable for storing and/or executing program code. For example, as shown in FIG. 7, a computer system 700 may include one or more processor(s) 702 with one or more cores per processor, associated memory elements 704, an internal storage device 706 (e.g., a hard disk, an optical drive such as a compact disk drive or digital video disk (DVD) drive, a flash memory stick, etc.), and numerous other elements and functionalities, typical of today's computers (not shown). The memory elements 704 may include a main system memory, e.g., a random access memory (RAM), employed during actual execution of the program code, and a cache memory, which provides temporary storage of at least some program code and/or data in order to reduce the number of times, code and/or data must be retrieved from a long-term storage medium or external bulk storage 716 for an execution. Elements inside the computer 700 may be linked together by means of a bus system 718 with corresponding adapters. Additionally, a database management system 720 including the monitoring system 600 (see element 600 in FIG. 6) may be attached to the system bus 718. The database management systems may also be linked directly to the one or more hard disk(s) 706 as indicated by the double arrow of FIG. 7.

The computer system 700 may also include input means, such as a keyboard 708, a mouse 710, or a microphone (not shown). Furthermore, the computer, may include output means, such as a monitor 712 (e.g., a liquid crystal display (LCD), a plasma display, a light emitting diode display (LED), or cathode ray tube (CRT) monitor). The computer system 700 may be connected to a network, e.g., a local area network (LAN), a wide area network (WAN), such as the Internet or any other similar type of network, including wireless networks via a network interface connection 714. This may allow a coupling to other computer systems or a storage network or a tape drive. Those, skilled in the art will appreciate that many different types of computer systems exist, and the afore-mentioned input and output means may take other forms. Generally speaking, the computer system 700 may include at least the minimal processing, input and/or output means, necessary to practice embodiments of the invention.

Further, those skilled in the art will appreciate that one or more elements of the afore-mentioned computer system 700 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

While the invention has been described with respect to a limited number of embodiments, those skilled in the art, having benefit of this disclosure, will appreciate that other embodiments can be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. On the other side, the term "comprising" may also include the case of "consisting of". Also, elements described in association with different embodiments may be combined. It should also be noted that reference signs in the claims should not be construed as limiting elements.

The invention claimed is:

1. A computer-implemented method of monitoring stored procedures executed in a database management system, the computer-implemented method comprising:
    a computer determining, for a stored procedure that is executed in a database management system, an identification of the stored procedure and event data related to the stored procedure, wherein the event data related to the stored procedure comprises:
    a first time indicative of a beginning of an execution of the stored procedure,
    a second time indicative of an end of the execution of the stored procedure,
    a structured query language (SQL) statement identifier assigned to an SQL statement that is executed as part of the stored procedure, and
    a counter for said SQL statement identifier, wherein said counter indicates how many times said SQL statement executed between the first time and the second time;
    providing, by the database management system, regular database monitoring information, wherein the regular database monitoring information comprises values of parameters of the executed SQL statement that is identified by the SQL statement identifier;
    calculating an average parameter value of at least one parameter of the executed SQL statement; and
    correlating said values of parameters of the executed SQL statement identified by the SQL statement identifier with the counter of the number of executions the SQL statement executed between the first time and the second time as part of the stored procedure, wherein said correlating monitors the stored procedure executed in the database management system, and wherein said correlating is further performed by multiplying the average parameter value of said at least one parameter with the number of executions of the identified SQL statement, wherein the SQL statement identifier, representing the SQL statement having the average parameter value, equals the SQL statement identifier relating to the number of executions.

2. The computer-implemented method of claim 1, wherein the regular database monitoring information comprise only values of parameters related to executed SQL statements identifiable by SQL statement identifiers for those SQL statements that have been executed as part of the stored procedure.

3. The computer-implemented method of claim 1, wherein each of the parameters of executed SQL statements comprises a combination of a number of executions of the SQL statement, a number of rows in the database management system that are examined, a number of rows in the database management system that are processed, and a number of buffer writes to a buffer used to store the regular database monitoring information.

4. The computer-implemented method of claim 1, further comprising:
    storing the regular database monitoring information in a first buffer in the database management system; and
    storing the event data in a second buffer in the database management system, wherein storing operations to the first buffer and storing operations to the second buffer are performed independently from each other.

5. The computer-implemented method of claim 1, further comprising:
    storing the regular database monitoring information and the event data in a combined buffer in the database management system.

6. The computer-implemented method of claim 1, further comprising:
    providing a first interface for making data monitoring of data related to the stored procedure available to a system outside a database server that is running the database management system.

7. The computer-implemented method of claim 6, further comprising:
    providing a second interface for making the event data and the regular database monitoring information available to the system outside the database server that is running the database management system.

8. The method of claim 1, wherein parameters of the executed SQL statement are statistical information describing a performance of a database being accessed by the stored procedure.

9. The computer-implemented method of claim 1, wherein each of the parameters of executed SQL statements comprises a combination of a number of executions of the SQL statement, a number of rows in the database management system that are examined, a number of rows in the database management system that are processed, a number of index scans, a number of table space scans, a number of buffer writes, an accumulated database time, an accumulated processor time (CPU time), an accumulated time for lock, an accumulated wait time for synchronous I/O, a number of getpages, a number of synchronous buffer reads, a number of database sort operations, a number of parallel groups created, a number of times a record ID list was not used because of exceeded limits, a number of times a record ID list was not used because there was not enough memory to hold the record ID list, and a number of buffer writes to a buffer used to store the regular database monitoring information.

10. A system comprising:
a first providing hardware unit adapted for providing for a stored procedure that is executed in a database management system, an identification of the stored procedure and event data related to the stored procedure, wherein the event data related to the stored procedure comprises:
a first time indicative of a beginning of an execution of the stored procedure,
a second time indicative of an end of the execution of the stored procedure,
a structured query language (SQL) statement identifier assigned to an SQL statement that is executed as part of the stored procedure, and
a counter for said SQL statement identifier, wherein said counter indicates how many times said SQL statement executed between the first time and the second time;
a second providing hardware unit adapted for providing, by the database management system, regular database monitoring information, wherein the regular database monitoring information comprises values of parameters of the executed SQL statement that is identified by the SQL statement identifier, wherein each of the parameters of executed SQL statements comprises a combination of a number of executions of the SQL statement, a number of rows in the database management system that are examined, a number of rows in the database management system that are processed, and a number of buffer writes to a buffer used to store the regular database monitoring information; and
a correlating hardware unit adapted for correlating said values of parameters of the executed SQL statement identified by the SQL statement identifier with the counter of the number of executions the SQL statement executed between the first time and the second time as part of the stored procedure, wherein said correlating monitors the stored procedure executed in the database management system.

11. The system of claim 10, wherein at least one parameter of at least one of the executed SQL has multiple values, and wherein the system further comprises:
a calculating hardware unit for calculating an average parameter value of said at least one parameter using the multiple values of said at least one parameter.

12. The system of claim 11, wherein said correlating said values of parameters of executed SQL statements is performed by multiplying the average parameter value of said at least one parameter with the number of executions of the identified SQL statement, wherein the SQL statement identifier, representing the SQL statement having the average parameter value, equals the SQL statement identifier relating to the number of executions.

13. The system of claim 10, wherein the regular database monitoring information comprise only values of parameters related to executed SQL statements identifiable by SQL statement identifiers for those SQL statements that have been executed as part of the stored procedure.

14. A computer program product for monitoring stored procedures executed in a database management system, the computer program product comprising a tangible non-transitory computer readable storage medium having program code embodied therewith, wherein the program code is readable and executable by a processor to perform a method comprising:
determining, for a stored procedure that is executed in a database management system, an identification of the stored procedure and event data related to the stored procedure, wherein the event data related to the stored procedure comprises:
a first time indicative of a beginning of an execution of the stored procedure,
a second time indicative of an end of the execution of the stored procedure,
a structured query language (SQL) statement identifier assigned to an SQL statement that is executed as part of the stored procedure, and
a counter for said SQL statement identifier, wherein said counter indicates how many times said SQL statement executed between the first time and the second time;
providing, by the database management system, regular database monitoring information, wherein the regular database monitoring information comprises values of parameters of the executed SQL statement that is identified by the SQL statement identifier, wherein each of the parameters of executed SQL statements comprises a combination of a number of executions of the SQL statement, a number of rows in the database management system that are examined, a number of rows in the database management system that are processed, and a number of buffer writes to a buffer used to store the regular database monitoring information; and
correlating said values of parameters of the executed SQL statement identified by the SQL statement identifier with the counter of the number of executions the SQL statement executed between the first time and the second time as part of the stored procedure, wherein said correlating monitors the stored procedure executed in the database management system.

15. The computer program product of claim 14, wherein at least one parameter of at least one of the executed SQL has multiple values, and wherein the program code further comprises executable code for:
calculating an average parameter value of said at least one parameter using the multiple values of said at least one parameter.

16. The computer program product of claim 15, wherein said correlating said values of parameters of executed SQL statements is performed by multiplying the average parameter value of said at least one parameter with the number of executions of the identified SQL statement, wherein the SQL statement identifier, representing the SQL statement having the average parameter value, equals the SQL statement identifier relating to the number of executions.

17. The computer program product of claim 14, wherein the regular database monitoring information comprise only values of parameters related to executed SQL statements identifiable by SQL statement identifiers for those SQL statements that have been executed as part of the stored procedure.

18. The computer program product of claim 14, wherein each of the parameters of executed SQL statements comprises a combination of a number of executions of the SQL statement, a number of rows in the database management system that are examined, a number of rows in the database management system that are processed, and a number of buffer writes to a buffer used to store the regular database monitoring information.

* * * * *